(12) United States Patent
Saretto et al.

(10) Patent No.: US 8,799,300 B2
(45) Date of Patent: Aug. 5, 2014

(54) BOOKMARKING SEGMENTS OF CONTENT

(75) Inventors: Cesare J. Saretto, Seattle, WA (US);
Matthew J. Pope, Seattle, WA (US);
Kathleen P. Mulcahy, Seattle, WA (US);
Geoffrey A. Long, Bainbridge Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/024,542

(22) Filed: Feb. 10, 2011

(65) Prior Publication Data
US 2012/0209841 A1 Aug. 16, 2012

(51) Int. Cl.
*G06F 7/00* (2006.01)
*G06F 17/30* (2006.01)

(52) U.S. Cl.
CPC .............................. *G06F 17/30793* (2013.01)
USPC .......................... 707/756; 707/805; 386/241

(58) Field of Classification Search
None
See application file for complete search history.

(56) References Cited

U.S. PATENT DOCUMENTS

| | | | |
|---|---|---|---|
| 7,624,337 B2 | 11/2009 | Sull et al. | |
| 7,725,919 B1 | 5/2010 | Thiagarajan et al. | |
| 2002/0069218 A1* | 6/2002 | Sull et al. | 707/501.1 |
| 2003/0093790 A1* | 5/2003 | Logan et al. | 725/38 |
| 2007/0154190 A1 | 7/2007 | Gilley et al. | |
| 2007/0192299 A1* | 8/2007 | Zuckerberg et al. | 707/3 |
| 2007/0266048 A1* | 11/2007 | Prosser et al. | 707/104.1 |
| 2009/0049118 A1 | 2/2009 | Stevens | |
| 2009/0131177 A1* | 5/2009 | Pearce | 463/43 |
| 2009/0199106 A1* | 8/2009 | Jonsson et al. | 715/744 |
| 2009/0228342 A1* | 9/2009 | Walker et al. | 705/10 |
| 2010/0042642 A1 | 2/2010 | Shahraray et al. | |

FOREIGN PATENT DOCUMENTS

CN 101589383 11/2009

OTHER PUBLICATIONS

Bernice, et al., "Tags, Micro-Tags and tag editing: improving internet search", Retrieved at <<http://7643939055104019192-a-1802744773732722657-s-sites.googlegroups.com/site/bernice rogowitz/publications--2008-2009/RogowitzandTopkara%2CSPIE7240-652009%2CMicro-TagsandSearch.pdf?attach-auth=ANoY7cr5Xp_GPKdTVPp3bJIz2OmWsIGZrz-m5DS8-kpfDwN248jvXxXcQhAmYE3XjoJZ-eWXYPvfe0EJbMEFT-9Nvwcz4c6c3vHofyU4BkiRSQ0rPblfWBYx5BsKiXyTKM_x_GnsDdO7owZEkPJLjTbzhho_g4248.

"AHRC guides tutorials from the Arts & Humanities resource center", Retrieved at<<http://www.dartmouth.edu/~ahrc/docs/DVDBookmarkGuide.pdf>>, 2008, pp. 3.

"Online video publishing gets into the conversation: click.TV", Retrieved at <<http://www.masternewmedia.org/news/2006/04/18/online_video_publishing_gets_into.htm>>, Apr. 18, 2006, pp. 13.

"Foreign Office Action", CN Application No. 201210029043.3, Dec. 23, 2013, 15 Pages.

* cited by examiner

*Primary Examiner* — Fred I Ehichioya
*Assistant Examiner* — Hasanul Mobin
(74) *Attorney, Agent, or Firm* — Micah Goldsmith; Glen Johnson; Micky Minhas

(57) ABSTRACT

A request from a user to bookmark a segment of content is received at a computing device. The segment of content is identified automatically and/or manually by the user. An expression of the user regarding a particular attribute of the segment of content is obtained, and a bookmark is generated. The bookmark includes both an identification of the segment of content and metadata that includes the expression of the user.

17 Claims, 6 Drawing Sheets

BOOKMARKING SEGMENTS OF CONTENT

BACKGROUND

A wide variety of audio and/or video content is available to users. Various programs or services allow users to provide their comments or feedback regarding particular content, such as particular songs, particular movies, and so forth. However, such programs or services are not without their problems. One problem is that such comments or feedback typically end up being associated with the entire content (e.g., the entire song or movie), and it is difficult for the user to easily identify a particular portion of the content regarding which he or she desires to provide a comment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects a request from a user to bookmark a segment of content is received at a computing device. The segment of content is identified, and an expression of the user regarding a particular attribute of the segment of content is obtained. A bookmark is generated, the bookmark including both an identification of the segment of content and one or more tags that include the expression of the user.

BRIEF DESCRIPTION OF THE DRAWINGS

The same numbers are used throughout the drawings to reference like features.

DETAILED DESCRIPTION

Bookmarking segments of content is discussed herein. A user can input a request to create a bookmark for a particular segment of content, with the beginning location and ending location of that particular segment within the content being identified automatically and/or by the user. The segment itself, or an identifier of the segment, is saved in the bookmark. An expression of the user regarding a particular attribute of the segment is also obtained, such as an indication that the user likes or dislikes the segment. This expression, as well as various other information associated with the content and/or frames of the segment, are also stored in the bookmark as metadata. The bookmarks can be used in various manners, such as being subsequently retrieved and the corresponding segment of the content played back, being used to recommend other content that may be of interest to the user, being shared with other users, and so forth.

Figure 1:
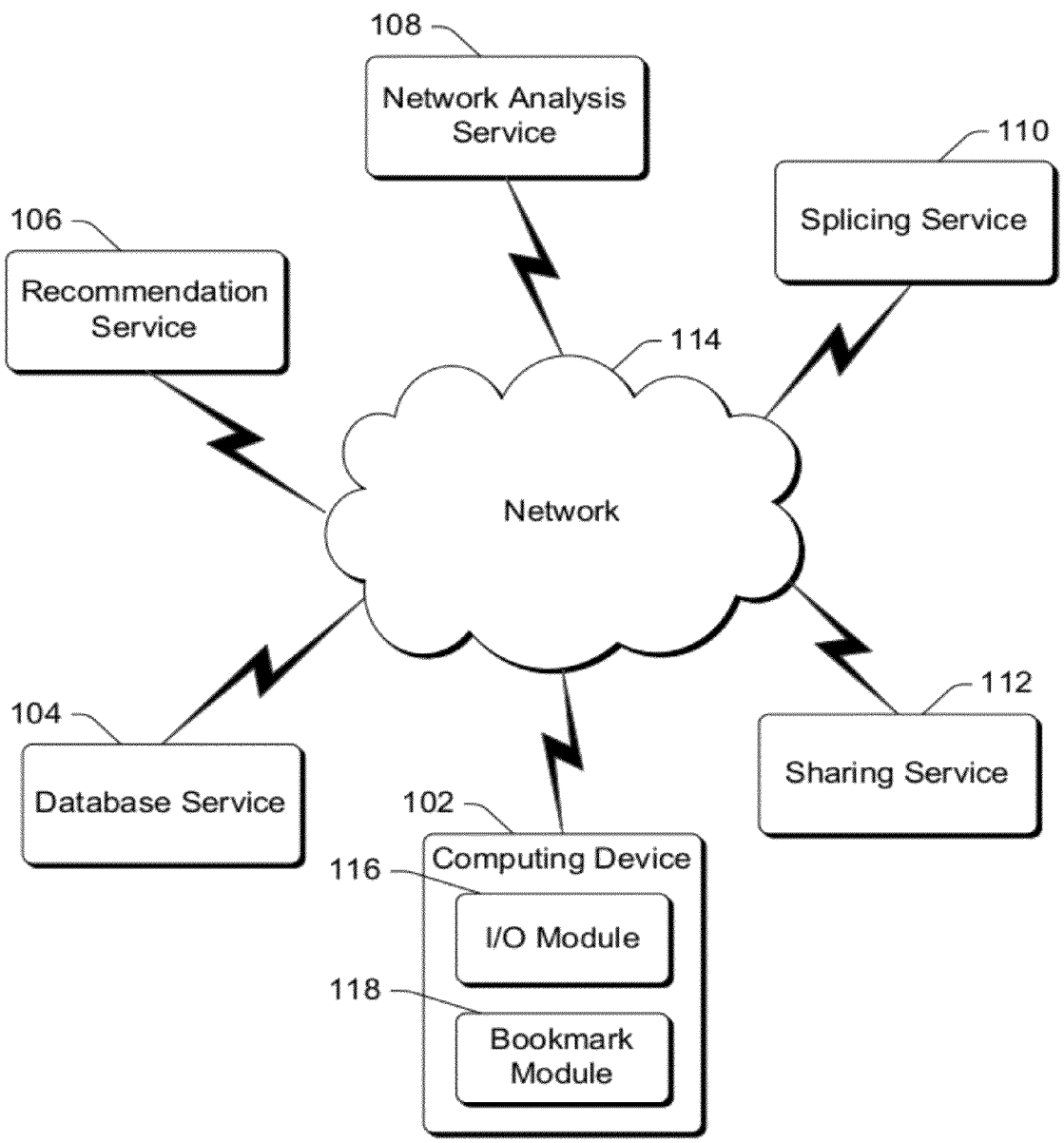
FIG. 1 illustrates an example system implementing the bookmarking segments of content in accordance with one or more embodiments.

FIG. 1 illustrates an example system 100 implementing the bookmarking segments of content in accordance with one or more embodiments. System 100 includes a computing device 102 that can communicate with one or more services 104, 106, 108, 110, and 112 via a network 114. Network 114 can be a variety of different networks, including the Internet, a local area network (LAN), a public telephone network, an intranet, other public and/or proprietary networks, combinations thereof, and so forth.

Computing device 102 can be a variety of different types of devices. For example, computing device 102 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, handheld game consoles).

Each service 104-112 is implemented by one or more computing devices. Similar to the discussion of computing device 102, services 104-112 can be implemented by a variety of different types of devices, ranging from a full resource device with substantial memory and processor resources to a low-resource device with limited memory and/or processing resources. Additionally, at least part of each of multiple services 104-112 can be implemented on the same computing device.

Computing device 102 includes an input/output (I/O) module 116 and a bookmark module 118. I/O module 116 allows a user of computing device 102 to input requests, data, and/or other information to computing device 102, and also allows data and/or other information to be played back to a user of computing device 102. Bookmark module 118 facilitates the bookmarking of segments of content and using bookmarks that have been created for segments of content as discussed in more detail below. Bookmarking a segment of content allows the user to identify a particular segment of the content and have various tags associated with that particular segment (e.g., indications of why the user liked the particular segment or did not like the particular segment, other emotions associated with the segment, other metadata associated with the content and/or particular segment, and so forth). Using a bookmark that has been created for a segment of content refers to playing back the segment of content and/or various tags associated with the particular segment, allowing a user to search for bookmarks, and so forth.

I/O module 116 receives user inputs from a user of computing device 102. User inputs can be provided by the user in a variety of different manners, such as by pressing one or more keys of a keypad or keyboard of computing device 102, pressing one or more keys of a controller (e.g., remote control device, mouse, trackpad, etc.) of computing device 102, pressing a particular portion of a touchpad or touchscreen of computing device 102, making a particular gesture on a touchpad or touchscreen of computing device 102, and/or making a particular gesture on a controller (e.g., remote control device, mouse, trackpad, etc.) of computing device 102.

User inputs can also be provided via other physical feedback input to computing device 102, such as tapping any portion of computing device 102, an action that can be recognized by a motion detection component of computing device 102 (such as shaking computing device 102, rotating computing device 102, etc.), and so forth. User inputs can also be provided in other manners, such as via audible inputs to a microphone, via motions of hands or other body parts observed by an image capture device, via facial expression observed by an image capture device, and so forth.

Computing device 102 can also include a display to allow data and/or other information to be displayed to a user. Alternatively, computing device 102 can generate one or more signals that are provided to a display device that is separate from computing device 102, allowing data and/or other information to be displayed via this separate display device. Such a display, whether part of computing device 102 or separate from computing device 102, can be implemented in different manners, such as using liquid crystal display (LCD) technology, plasma screen technology, image projection technology, and so forth. Similarly, computing device 102 can include a speaker, or generate one or more signals that are provided to a separate speaker device, for audible presentation of data and/or other information. Such a speaker can be implemented in a variety of different manners, such as a free-standing speaker, a speaker included as part of another device (e.g., a television, a wireless phone, etc.), a speaker included as part of a set of headphones, and so forth.

System 100 also includes a database service 104, a recommendation service 106, a network analysis service 108, a splicing service 110, and a sharing service 112. Although illustrated as separate services, it should be noted that one or more of services 104-112 can be implemented as a single service. Similarly, it should be noted that the functionality discussed herein with regard to one or more of services 104-112 can be separated into multiple services.

Database service 104 maintains a record of bookmarks that are generated by bookmark module 118, and a record of which users of system 100 have bookmarked particular content (and/or particular segments of particular content). Recommendation service 106 analyzes the bookmarks in database service 104 and generates recommended content, or recommended content portions, based on this analysis. Network analysis service 108 analyzes the bookmarks in database service 104 and generates metadata to be associated with particular content, or particular segments of content, based on this analysis. Splicing service 110 analyzes the bookmarks in database service 104 and splices together multiple segments of content to generate a content collection or highlights collection reel. Sharing service 112 facilitates sharing bookmarks among multiple users of system 100.

Figure 2:
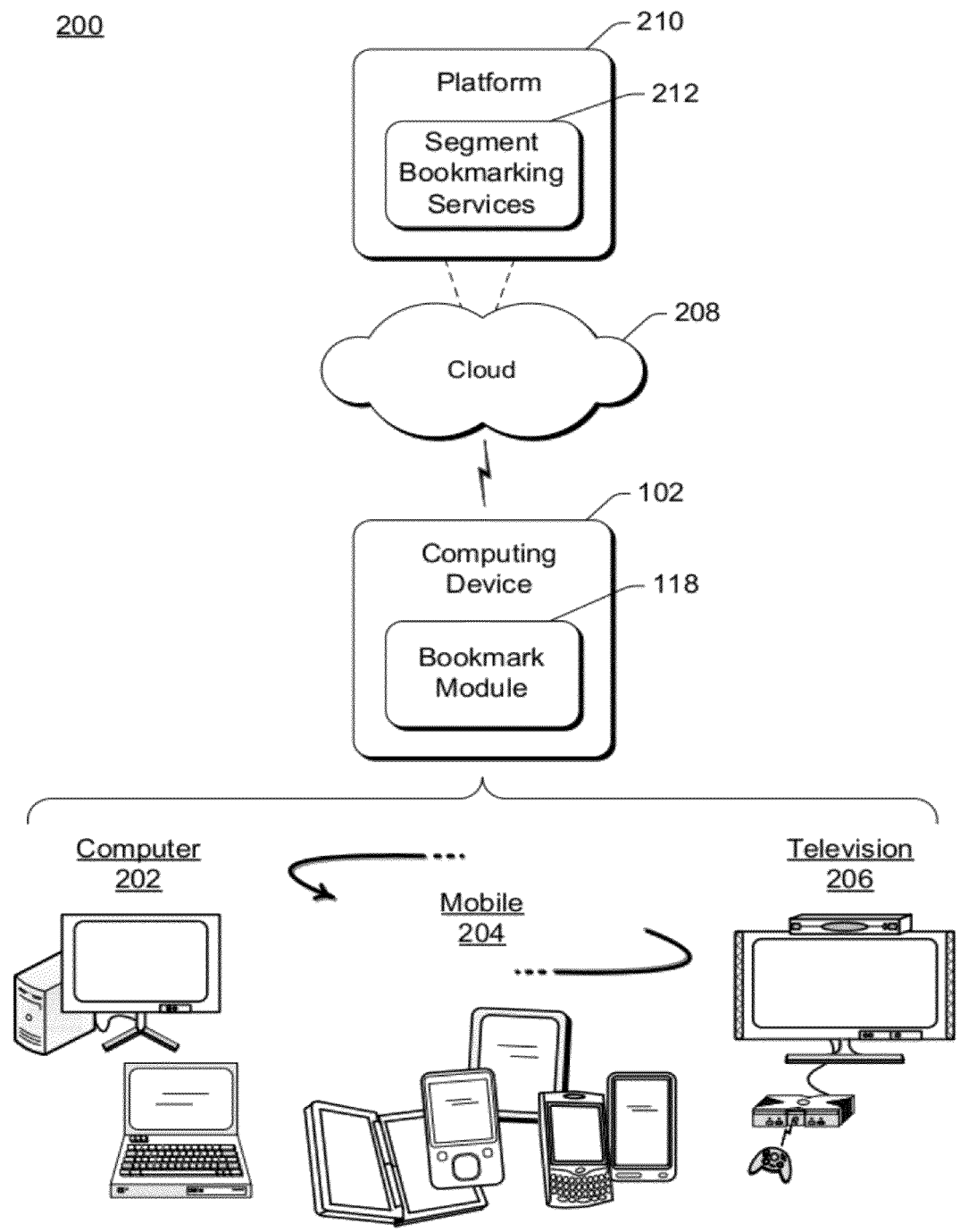
FIG. 2 illustrates another example system implementing the bookmarking segments of content in accordance with one or more embodiments.

FIG. 2 illustrates another example system 200 implementing the bookmarking segments of content in accordance with one or more embodiments. The example system 200 enables ubiquitous environments for a seamless user experience when running applications on any type of computer, television, and/or mobile device. Services and applications run substantially similar in all environments for a common user experience when transitioning from one device to the next while utilizing an application, playing a video game, watching a video, listening to music, and so on.

In the example system 200, multiple devices can be interconnected through a central computing device, which may be local to the multiple devices or may be located remotely from the multiple devices. In one embodiment, the central computing device may be a cloud of one or more server computers that are connected to the multiple devices through a network, the Internet, or other data communication link. In embodiments, this interconnection architecture enables functionality across multiple devices to provide a common and seamless experience to a user of the multiple devices. Each of the devices may have different physical requirements and capabilities, and the central computing device uses a platform to enable delivery of an experience that is both tailored to a particular device and yet common to all of the devices. In one embodiment, a class of target devices is created and user experiences are tailored to the generic class of devices. A class of devices may be defined by physical features, types of usage, or other common characteristics of the devices.

In various implementations, computing device 102 may be implemented in a variety of different configurations, such as for computer 202, mobile 204, and television 206 uses. Each of these configurations includes devices that may have generally different constructs and capabilities, and the computing device may be configured according to one or more of the different device classes. For example, the computing device may be implemented as any type of a personal computer, desktop computer, a multi-screen computer, laptop computer, tablet, netbook, and so on.

The computing device 102 may also be implemented as any type of mobile device, such as a mobile phone, portable music player, portable gaming device, a tablet computer, a multi-screen computer, and so on. The computing device may also be implemented as any type of television device having or connected to generally larger screens in casual viewing environments. These devices include televisions, set-top boxes, gaming consoles, and so on. The techniques described herein may be supported by these various configurations of the computing device and are not limited to the specific examples of segment bookmarking services described herein.

The cloud 208 includes and/or is representative of a platform 210 for segment bookmarking services 212. Segment bookmarking services 212 include one or more of database service 104, recommendation service 106, network analysis service 108, splicing service 110, and sharing service 112 of FIG. 1. The platform abstracts underlying functionality of hardware, such as server devices, and/or software resources of the cloud. The segment bookmarking services may include applications and/or data that can be utilized while computer processing is executed on servers that are remote from the computing device. The segment bookmarking services 212 can be provided as a service over the Internet and/or through a subscriber network, such as a cellular or WiFi network.

The platform 210 may abstract resources and functions to connect the computing device 102 with other computing devices. The platform may also serve to abstract scaling of resources to provide a corresponding level of scale to encountered demand for the services that are implemented via the platform. Accordingly, in an interconnected device embodiment, implementation of functionality of bookmark module 118 may be distributed throughout the system 200. For example, bookmark module 118 may be implemented in part on computing device 102 as well as via the platform that abstracts the functionality of the cloud.

Returning to FIG. 1, services 104-112 can receive and analyze information obtained from a user of computing device 102. In one more embodiments, information is obtained from a user of computing device 102 only after receiving user consent to obtain and use such information. This user consent can be an opt-in consent, where the user takes an affirmative action to request that the information be obtained and used before user bookmark module 118 obtains any such information for that user. Alternatively, this user consent can be an opt-out consent, where the user takes an affirmative action to request that the information for that user not be obtained by bookmark module 118. If the user does not choose to opt out of having this information obtained and used, then it is an implied consent by the user to obtain and use this information.

Furthermore, it should be noted that the obtaining and using of such information can allow services 104-112 to distinguish between different users, but need not include any personal information identifying particular users. For example, a user or user's device may log in to computing device 102 or a service 104-112 with a particular user name or identity, but no association between that user name and the actual person need be maintained. Accordingly, services 104-112 can obtain and use information for the user with that particular user name, and at the same time have no knowledge of who that user actually is.

Figure 3:
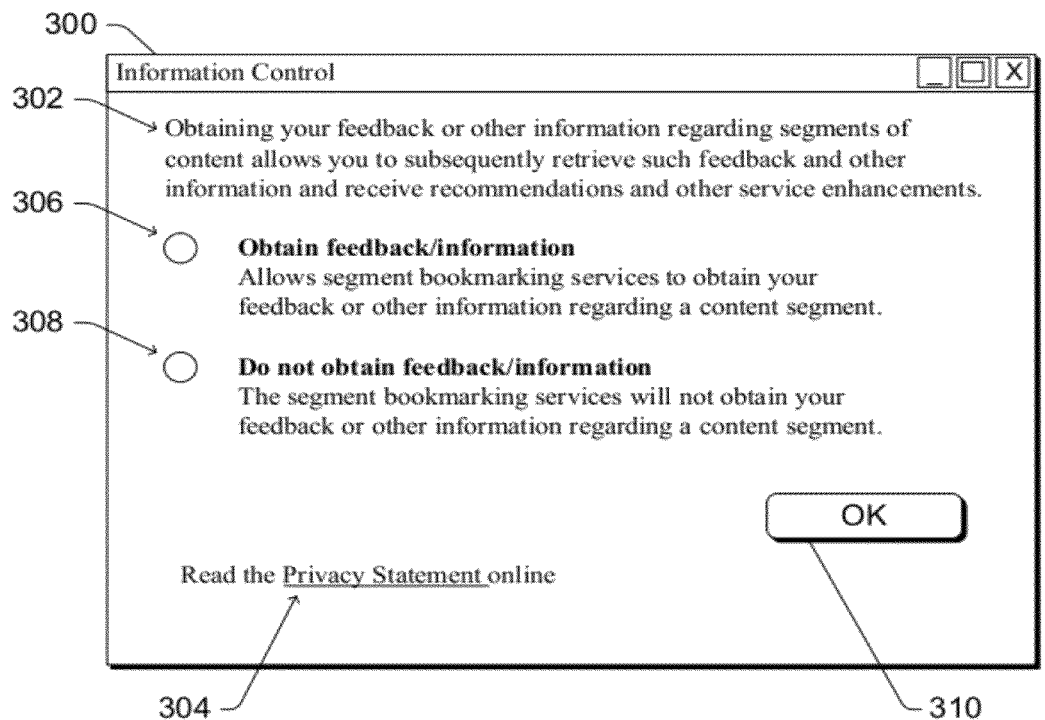
FIG. 3 illustrates an example user interface that can be displayed to a user to allow the user to select whether services will obtain and use information regarding the user in accordance with one or more embodiments.

FIG. 3 illustrates an example user interface that can be displayed to a user to allow the user to select whether services 104-112 will obtain and use information regarding the user in accordance with one or more embodiments. An information control window 300 is displayed including a description 302 explaining to the user why feedback or other information for the user is obtained and used. A link 304 to a privacy statement is also displayed. If the user selects link 304, a privacy statement of service 102 is displayed, explaining to the user how the information obtained is kept confidential.

Additionally, the user is able to select a radio button 306 to opt-in to having the information obtained and used, or a radio button 308 to opt-out of having the information obtained and used. Once a radio button 306 or 308 is selected, the user can select an "OK" button 310 to have the selection saved. It is to be appreciated that radio buttons and an "OK" button are only examples of user interfaces that can be presented to a user to opt-in or opt-out of the information obtaining and usage, and that a variety of other conventional user interface techniques can alternatively be used. Bookmark module 118 and services 104-112 then proceed to obtain and use, or not obtain (and thus not use), the information in accordance with the user's selection.

Returning to FIG. 1, bookmark module 118 facilitates the bookmarking of segments of content as well as using bookmarks that have been created for segments of content. Bookmark module 118 can be an application or program running solely on computing device 102, or alternatively can be a client application or program that operates in conjunction with one or more other programs or applications on one or more of services 104-112. For example, user inputs received by I/O module 116 can be received and processed by bookmark module 118, or alternatively can be received by bookmark module 118 and forwarded to one or more of services 104-112 for processing.

Bookmark module 118 facilitates the bookmarking of segments of content. The content discussed herein refers to audio and/or video content, such as movies, television shows, songs, and so forth. The content can include content that is played back without user interaction, such as movies, songs, and so forth. The content can also include content that is played back with user interaction, such as video games, karaoke songs, and so forth. For example, the audio and/or video playback of a video game can be recorded as the game is played and can be content as discussed herein.

A segment of content refers to a portion of the content that is less than the entire content. For example, a segment of content can refer to a portion of a movie, a portion of a song, a portion of a recorded video game, and so forth. This segment of content has a beginning location or time corresponding to the content that indicates the beginning (with reference to the content) of the segment. Similarly, this segment of content has an ending location or time corresponding to the content that indicates the ending (with reference to the content) of the segment.

I/O module 116 can play back various content as discussed above. A user of computing device 102 can, during playback of content, input a bookmark request. This bookmark request can be input in a variety of different manners as discussed above, such as by touching a particular hyperlink, button, or key, by speaking a particular command, by making a particular hand or body motion, and so forth. The bookmark request can be a request to generate a bookmark for a segment of content, or alternatively can also include a request to perform another action with the bookmark (e.g., share the bookmark with other users via sharing service 112). In response to the bookmark request, bookmark module 118 determines the segment of the content that is of interest to the user based at least in part on the particular part of the content being played back at the time the bookmark request is received. This determined segment of content is the segment of content that is associated with the bookmark, and is also referred to as the segment of content that is bookmarked. As the segment of content is part of the content, the bookmark can also be referred to as being associated with the content of which the segment is a part.

The segment of content associated with the bookmark can be determined in different manners. The segment of content can be automatically determined based on the particular part of the content being played back at the time the bookmark request is received and/or can be manually determined by the user of computing device 102. In one or more embodiments, the segment of content is automatically determined by selecting a particular amount of content (e.g., five seconds, eleven seconds, etc.) before and/or after the location in the content being played back at the time the bookmark request is received. The amount of content that is selected can vary and a different amount can be selected before the location than is selected after the location. The amount of content that is selected can also be a user-configurable parameter. For example, assume that the user inputs the bookmark request at a time offset of 12:33 (12 minutes and 33 seconds) after the beginning of the content. An amount of content five seconds before and seven seconds after can be selected, so the segment of content is the portion of the content beginning at 12:28 after the beginning of the content and ending at 12:40 after the beginning of the content.

In one or more embodiments, the segment of content associated with the bookmark is automatically determined as the scene or chapter that includes the location in the content being played back at the time the bookmark request is received. This scene or chapter can be determined in different manners, such as based on scene or chapter indicators included in metadata of the content. Alternatively the scene or chapter can be determined by using a scene detection process that identifies different scenes in a variety of different conventional manners (e.g., based on image composition, audio characteristics of the content, and so forth).

In one or more embodiments, the segment of content associated with the bookmark is identified by the user of computing device 102. The user can provide a variety of different inputs to indicate a beginning and/or ending of the segment of content. For example, the user can provide an input (using the xx:yy format, where "xx" refers to a number of minutes and "yy" refers to a number of seconds) of a beginning of the segment and the ending of the segment, relative to the beginning of the content (or relative to some other location in the content). By way of another example, the user may move a slider or tab along a playback line representing the content, or slide his or her finger across a screen, to indicate a beginning of the segment and the ending of the segment.

Bookmark module 118 also generates a bookmark based on the bookmark request. The bookmark is a data structure associated with the segment of content and includes an identification of the associated segment of content. The identification can be the segment of content (the audio and/or video content for that segment) itself. Alternatively, the identification can be another identifier of the segment of content, such as an indication of the beginning and ending of the segment (e.g., time offsets from the beginning of the content) and a pointer or other link to the content. Alternatively, a separate content clip can be generated that includes the segment of content but not other portions of the content, this separate content clip can be stored as a separate file or other data structure, and the identification can be a pointer or link to this separate content clip.

A user can subsequently select a bookmark and have the associated segment of the content played back. Such playback starts at the beginning of the segment (and typically stops at the ending of the segment). Accordingly, the user need not fast forward through other portions of the content in an attempt to locate the beginning of the segment. Rather, playback of the segment automatically begins at the beginning of the segment.

Figure 4:
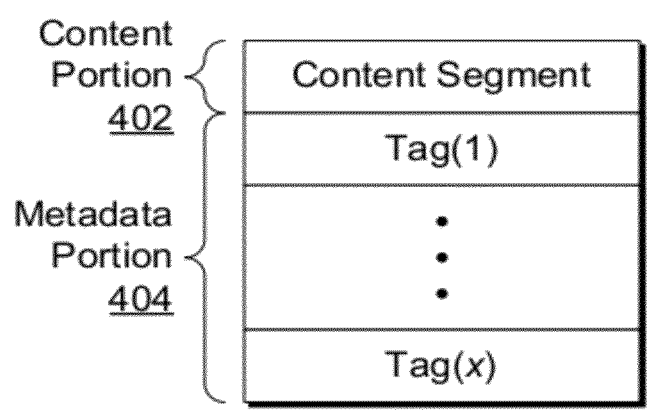
FIG. 4 illustrates an example bookmark in accordance with one or more embodiments.

FIG. 4 illustrates an example bookmark 400 in accordance with one or more embodiments. Bookmark 400 includes a content portion 402 and a metadata portion 404. Content portion 402 includes an identification of the content segment associated with bookmark 400, which can be the content itself or another identification of the segment as discussed above. Metadata portion 404 includes one or more (x) tags for the bookmark. These tags identify various information regarding the segment of content associated with the bookmark, the content that includes that segment of content, and/or other expressions of the user regarding a particular attribute of the segment of content associated with the bookmark as discussed in more detail below.

In one or more embodiments bookmark 400 is stored in a manner that associates bookmark 400 with the content of which the segment of content identified in content portion 402 is a part. Accordingly, bookmark 400 need not include an explicit identifier of the content. Alternatively, bookmark 400 can be stored in other manners and/or can include an identifier of the content of which the segment of content identified in content portion 402 is a part. This identifier of the content can be an additional portion (not shown) of bookmark 400, can be included as a tag of metadata portion 404, can be inherent in the identifier of the segment in content portion 402, combinations thereof, and so forth.

Similarly, in one or more embodiments bookmark 400 is stored in a manner that associates bookmark 400 with a user that requested that the bookmark be created. This user can be identified in different manners, such as a user id presented by or for the user to log in to computing device 102, a user id presented by or for the user to log into another service of system 100, and so forth. Bookmark 400 can be stored by database service 104 or another service as associated with the identified user, and bookmark 400 thus need not include an explicit identifier of the user. Alternatively, bookmark 400 can be stored in other manners and/or can include an identifier of the user. This identifier of the user in bookmark 400 can be an additional portion (not shown) of bookmark 400, can be included as a tag of metadata portion 404, combinations thereof, and so forth.

Returning to FIG. 1, in addition to the identification of the segment of content, bookmark module 118 also includes one or more tags as metadata in the bookmark. These tags identify various information regarding the segment of content associated with the bookmark, information regarding the content associated with the bookmark, and/or other expressions by the user regarding the content or other metadata.

In one or more embodiments, characteristics of at least part of the content are obtained from a third party. The third party can be a variety of different entities, such as an entity that provided the content (e.g., a distributor of a movie, an artist performing a song, etc.), or another entity (e.g., other individuals operating on behalf of the entity that provided the content, an automated module or application, etc.). These characteristics can be included by the third party as part of the content, in a data structure associated with the content, or in another database or store. Various characteristics of the content as a whole can be obtained, such as a title of the content, a summary or description of the content, an identification of a creator of the content, an identification of actors or artists performing in the content, and so forth. These characteristics, obtained from one or more third parties, can be included as one or more tags in the metadata portion of the bookmark.

In addition to characteristics of the content as a whole, characteristics of a particular segment of the content can be included as one or more tags in the metadata portion of the bookmark. These characteristics can be obtained from various entities, analogous to the discussion above. These characteristics can be associated with particular portions of the content in a variety of different manners. For example, characteristics can be associated with a particular frame of content, with a particular collection or group of frames of content (e.g., 24 frames, 30 frames, etc.), with a particular chapter or other portion of content, and so forth. A characteristic that is associated with a portion of the content that is included at least in part (or alternatively included in whole) in the determined segment of content is also a characteristic of that determined segment of content. A variety of different characteristics can be associated with a segment of content, such as an identification of actors or artists performing in the segment of content, an identification of landmarks or other objects included in the segment of content, an identification of a season or time of day in the content, an identification of team players in the segment of content, a location where the segment of content was recorded or takes place, and so forth.

In one or more embodiments, the metadata in the bookmark includes one or more tags obtained from the user of computing device 102. These one or more tags include data representing an expression of the user regarding a particular attribute of the segment of content, and can be included in addition to (or alternatively in place of) tags including characteristics of the content and/or segment of content. The expression of the user regarding a particular attribute can be data or information provided by or otherwise obtained from the user. The expression of the user allows the user to indicate, for example, why he or she is bookmarking the segment of content. The expression of the user regarding a particular attribute can also be simply the bookmark request input by the user, in which case additional data or information need not be provided by or otherwise obtained from the user.

The expression of the user can be explicitly input by the user, such as by the user inputting particular text, by the user providing particular audible input, by the user selecting a "like" or "dislike" button, by the user indicating a particular rating (e.g., 2 out of 5 stars), and so forth. The expression of the user can also be obtained from the user in other manners, such as by bookmark module 118 (or I/O module 116) automatically sensing particular feedback from, or emotional response by, the user. For example, an image capture device and various feature detection algorithms can be used to identify a particular emotional response of a user of computing device 102 at any given time, such as determining whether a user of computing device 102 is smiling, laughing, crying, applauding, booing, and so forth. These emotional responses can be included as a tag for the bookmark.

An expression of the user can be obtained and added as a tag in the metadata portion of the bookmark, such as in response to a bookmark request being received from the user. The expression can be explicitly input by the user, or automatically sensed as discussed above. The data representing the expression, regardless of how obtained, is included in the metadata portion of the bookmark.

The particular attribute regarding which a user expression is obtained can be the segment of content itself (or the content itself) and/or other metadata associated with that segment of content (or with the content). For example, the user can be presented with "like" and "dislike" buttons for the segment of content and for each tag of a bookmark associated with the content or segment of content. The user can thus provide input as to whether he or she likes or dislikes the segment of content, as well as whether he or she likes or dislikes each tag of a bookmark associated with the segment of content.

For example, the user could be presented with a list of the characteristics of the segment of content that include a title of the content and an actor appearing in the segment of content. The user can select a "like" button or rating associated with the segment of content to indicate that he or she likes the particular segment of content, and select a "dislike" button or rating associated with the actor characteristic to indicate that he or she does not like the actor.

In one or more embodiments, the metadata in the bookmark includes one or more tags obtained from one or more other users (of computing device 102 or of other computing devices). Bookmark module 118 can obtain (e.g., from network analysis service 108 or another service) an indication of tags added by at least a threshold number of other users (or at least a threshold percentage of other users) for the segment of content. These tags can be viewed as characteristics of the segment of content, and included as tags in the metadata portion of the bookmark being created. For example, if at least a threshold number of users have added a tag for a segment of content identifying a type of car in the segment of content (or that the segment of content includes an exciting chase scene), then a tag identifying that type of car (or that the segment of content includes an exciting chase scene) can be included in the metadata portion of the bookmark. Thus, even though the developer or distributor of the content did not identify a particular characteristic of a particular segment of the content, if enough other users did identify that particular characteristic for that particular segment of the content then that particular characteristic is included in the metadata portion of the bookmark being added in response to the bookmark request from the user.

Additionally, in one or more embodiments the bookmark includes an indication of the type and/or source of the tags in the metadata portion. For example, the bookmark can include an indication of which tags are generated by a distributor of a movie and which tags include an expression obtained from a user. By way of another example, the bookmark can include an indication of which tags include expressions explicitly input by the user and which tags include expressions obtained by being automatically sensed.

Database service 104 maintains a record of the bookmarks that are created by various users. These bookmarks can be associated with particular users in different manners as discussed above. For example, database service 104 can maintain a separate storage area for each user, and store the bookmarks created by a particular user in that storage area. These bookmarks can be subsequently accessed by bookmark module 118 on behalf of a user of computing device 102. By way of another example, database service 104 can maintain a separate storage area for each content, and store bookmarks associated with that content (even though created by different users) in that storage area.

In one or more embodiments, bookmark module 118 supports search functionality, allowing a user to search through bookmarks he or she has previously created. The user can input particular search terms in response to which the bookmarks created by that user are searched and bookmarks having metadata that satisfies the search terms are presented to the user. Presenting the bookmarks can include displaying identifiers of the bookmarks, displaying metadata (e.g., a title of the content) in the bookmarks, presenting the content associated with the bookmarks, and so forth. This searching can be performed, for example, by bookmark module 118 and/or database service 104. For example, the user can enter a search term of "chase scene" and have all bookmarks with a tag of "chase scene" presented to the user. By way of another example, the user can enter a search term of "laughing" and have all bookmarks with a tag indicating the expression of the user was automatically detected as "laughing" presented to the user. By way of yet another example, the user can enter a search term of "not crying" and have all bookmarks with a tag indicating that an expression other than crying was automatically detected presented to the user. The user can take various actions with the presented bookmarks, such as selecting one or more bookmarks and have the segments of content identified in the selected one or more bookmarks played back, selecting one or more bookmarks and have the bookmarks shared with other users of system 100 (e.g., via sharing service 112), and so forth.

Similar to searching, a user can also browse through his or her bookmarks in other manners. For example, the user can request that all of his or her bookmarks be presented, in response to which the bookmarks that the user has created are retrieved and presented to the user. By way of another example, the user can request that all of his or her bookmarks associated with particular content be presented, in response to which the bookmarks that the user has created and that are associated with that particular content are retrieved and presented to the user.

In one or more embodiments, recommendation service 106 analyzes the bookmarks in database service 104 and generates recommended content, or recommended content portions, based on this analysis. Recommendation service 106 can perform this analysis in various manners. For example, recommendation service 106 can identify a particular expression obtained from a user (e.g., an expression from the user that a segment includes an exciting chase scene or a particular actor) at least a threshold number of times (or at least a threshold percentage of the time that bookmarks are created for that user), and identify other content and/or segments of content that particular expression as a characteristic (e.g., as provided by a third party and/or other users). An indication of this identified content and/or segments of content (e.g., titles associated with the content, audio and/or video clips of the content or segment, etc.) can be presented to the user of computing device 102 as recommended content for the user. The user can take various actions regarding the recommended content, such as playing back the recommended content, adding the recommended content to a content queue to be played back at a later time, and so forth. Thus, for example, if an expression that a segment includes an exciting chase scene is obtained from the user at least a threshold number of times, then other content (or other portions of content) having a characteristic of including an exciting chase scene can be recommended to the user.

Network analysis service 108 analyzes the bookmarks in database service 104 and generates characteristics to be associated with particular content (or particular segments of content) based on this analysis. Network analysis service 108 can perform this analysis in a variety of different manners. For example, network analysis service can identify, from the bookmarks in database service 104, tags that have been added by users to particular portions of content. These portions can be segments identified by users, frames of the content, collections or groups of frames of the content, and so forth. If at least a threshold number of users (or at least a threshold percentage of users) have added a tag to a particular portion of the content with a particular expression (e.g., that the particular portion includes an exciting chase scene or a particular actor), then that particular characteristic is added as metadata for that particular portion of the content. Thus, when bookmarks are subsequently created for a segment that includes that particular portion of the content, the metadata for such subsequently created bookmarks includes these characteristics generated by network analysis service 108.

Splicing service 110 analyzes the bookmarks in database service 104 and splices together multiple segments of content to generate a content collection or highlights collection reel. This content collection or highlights collection reel includes multiple segments of content (of the same and/or different content) having a particular tag. Splicing service 110 can perform this analysis in various manners. For example, splicing service 110 can identify a particular tag (e.g., an expression from the user that the segment includes an exciting chase scene or a good sports play) that the user has input for multiple different segments of the same or different content. Splicing service 110 can obtain the different segments of content for which the user has added a tag having that expression, and generate a "highlights" or summary collection of content that includes those obtained segments of content spliced together (e.g., played back one after another to the user). The user can take various actions with this collection of content, such as displaying the collection of content, sharing the collection with other users, and so forth.

Splicing service 110 can determine the tags to use automatically and/or based on a request from the user. For example, the user can input a request to have a highlight collection reel played back that includes all (or a particular number) of segments of content having a tag of "good sports play" or has a particular rating (e.g., 5 out of 5 stars). In response to such a request, splicing service 110 identifies the different segments of content for which the user has added a tag having that tag of "good sports play" or that particular rating, and generates a "highlights" or summary collection of content that includes those identified segments of content. By way of another example, splicing service 110 can automatically identify the tag for which a highlight collection reel is to be generated, such as a tag that has been added at least a threshold number of times (or at least a threshold percentage of the time that bookmarks are created for that user). Splicing service 110 identifies the different segments of content that include the automatically identified tag, and generates a "highlights" or summary collection of content that includes those identified segments of content.

Sharing service 112 facilitates sharing bookmarks among multiple users of system 100. In addition to (or alternatively in place of) database service 104 saving bookmarks, sharing service 112 can share a bookmark with other users. Sharing service 112 can facilitate sharing bookmarks in a variety of different manners, such as posting or otherwise identifying the bookmark on a social networking service, sending the bookmark to one or more other users via e-mail, sending the bookmark to one or more other users via a multimedia messaging service (MMS), combinations thereof, and so forth. For example, a user can input a request to have a newly created bookmark posted on a particular social networking service, allowing the user's friends to view the tags in the metadata portion of the bookmark and play back the segment of content associated with the bookmark.

It should be noted that search functionality can be implemented in conjunction with sharing service 112. Bookmarks that are shared by a user are made available for searching or browsing to other users. These can be other users specified by the user that created the bookmark (e.g., his or her friends on a social networking site), or can be all users of sharing service 112 or other users in a particular group (e.g., a group of which the user that created the bookmark is a part). These other users can thus search or browse through the bookmarks created by the user, analogous to the searching or browsing discussed above.

Figure 5:
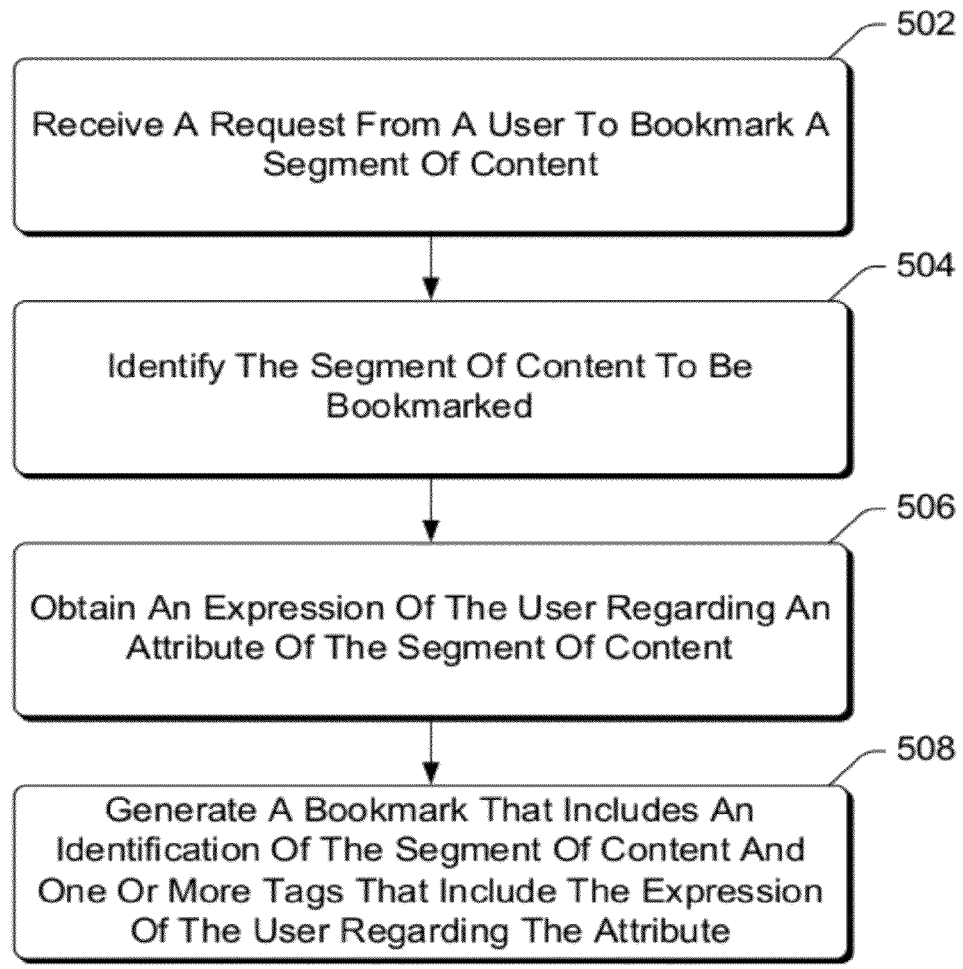
FIG. 5 is a flowchart illustrating an example process for bookmarking segments of content in accordance with one or more embodiments.

FIG. 5 is a flowchart illustrating an example process 500 for bookmarking segments of content in accordance with one or more embodiments. Process 500 is carried out by one or more devices or services, such as one or more devices or services in system 100 of FIG. 1, and can be implemented in software, firmware, hardware, or combinations thereof. Process 500 is shown as a set of acts and is not limited to the order shown for performing the operations of the various acts. Process 500 is an example process for bookmarking segments of content; additional discussions of bookmarking segments of content are included herein with reference to different figures.

In process 500, a request is received from a user to bookmark a segment of content (act 502). A variety of different content can be bookmarked as discussed above. Additionally, the user can input the request in a variety of different manners as discussed above.

The segment of content associated with the bookmark is identified (act 504). This segment of content can be identified in different manners as discussed above.

An expression of the user regarding a particular attribute of the segment is obtained (act 506). This expression can be explicitly input by the user and/or obtained from the user in other manners as discussed above. Additionally, as discussed above, this attribute of the segment can be the segment of content itself, metadata associated with the content, and/or metadata associated with the segment of content.

A bookmark that includes both an identification of the segment of content identified in act 504 and one or more tags including the expression of the user obtained in act 506 is generated (act 508). This bookmark can also include various additional tags as metadata, as discussed above.

Figure 6:
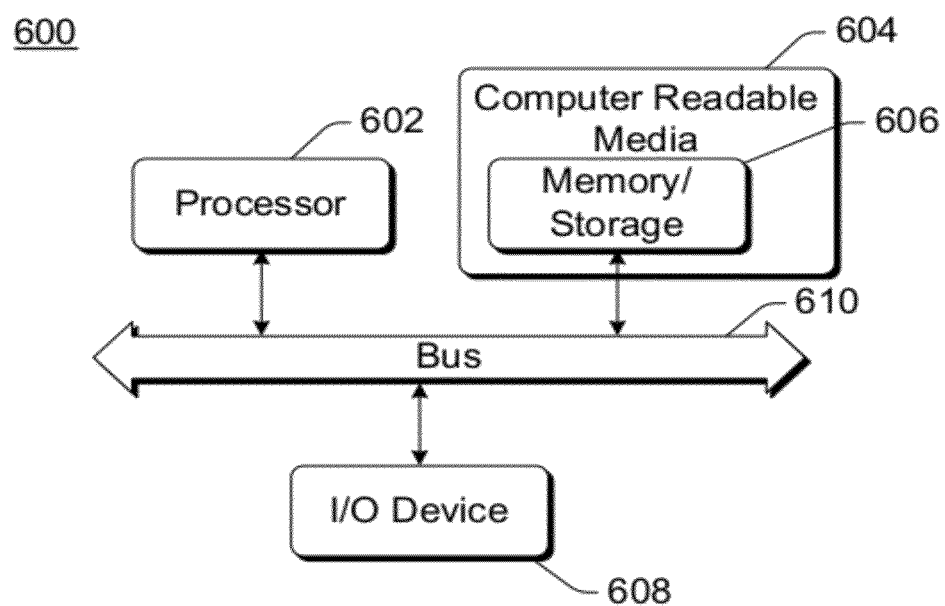
FIG. 6 illustrates an example computing device that can be configured to implement the bookmarking segments of content in accordance with one or more embodiments.

FIG. 6 illustrates an example computing device 600 that can be configured to implement the bookmarking segments of content in accordance with one or more embodiments. Computing device 600 can be, for example, computing device 102 of FIG. 1, or can implement at least part of one or more of services 104, 106, 108, 110, and/or 112 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the bookmarking segments of content techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, at a computing device, a request from a user to bookmark a segment of content, the content comprising audio and video;
   identifying the segment of content associated with the bookmark, the segment of content having both a beginning location and an ending location in the content;
   obtaining, using an image capture device, an emotional response of the user, the emotional response of the user being automatically sensed and regarding a particular attribute of the segment of content;
   generating a bookmark that includes both an identification of the segment of content and one or more tags that include the automatically sensed emotional response of the user; and
   causing:
   recommending additional content to the user by sending the bookmark to a recommendation service configured to identify the additional content based at least in part on an analysis of bookmarks that have been created in response to requests from the user, wherein recommendation of additional content is based on a particular emotional response of the user being identified more than a threshold number of times; and
   splicing together multiple segments by sending the bookmark to a splicing service configured to analyze the bookmark and to splice multiple segments of content together to generate content collections based on bookmarks containing similar emotional responses of the user.

2. A method as recited in claim 1, wherein the content comprising audio and video is audio and video playback of a video game.

3. A method as recited in claim 1, further comprising:
   obtaining characteristics of the segment of content; and
   including, in the bookmark, the characteristics of the segment of content.

4. A method as recited in claim 3, wherein the characteristics of the segment of content include tags added by other users of other computing devices when creating other bookmarks associated with portions of the content that are included in the segment of content.

5. A method as recited in claim 1, wherein identifying the segment of content comprises automatically determining the segment of content based at least in part on a particular part of the content being played back at a time that the request from the user is received.

6. A method as recited in claim 1, further comprising:
displaying an indication of the additional content.

7. A method as recited in claim 1, further comprising:
receiving a user request to search through previously created bookmarks for a search term;
identifying one or more segments of content each having an associated bookmark that includes the search term; and
presenting the one or more segments of content having an associated bookmark that includes the search term.

8. A method as recited in claim 1, further comprising:
displaying the multiple segments of content in the collection.

9. A method as recited in claim 1, further comprising sharing the bookmark with one or more other users.

10. One or more computer storage memory devices having stored thereon multiple instructions that, when executed by one or more processors of a computing device, cause the one or more processors to:
receive a user request to bookmark content, the content comprising audio and video;
identify a segment of the content associated with the bookmark, the segment of content having both a beginning location in the content and an ending location in the content;
obtain, using an image capture device, an emotional response of the user regarding an attribute of the segment of content, the emotional response being automatically sensed;
generate a bookmark that includes both an identification of the segment of content and the automatically sensed emotional response of the user; and
cause:
recommend additional content to the user by sending the bookmark to a recommendation service configured to identify the additional content based at least in part on an analysis of bookmarks that have been created in response to requests from the user, recommendation of additional content being based on a particular emotional response of the user being identified more than a threshold number of times; and
splice together multiple segments by sending the bookmark to a splicing service configured to analyze the bookmark and to splice multiple segments of content together to generate content collections based on bookmarks containing similar emotional responses of the user.

11. One or more computer storage memory devices as recited in claim 10, wherein the content comprising audio and video is audio and video playback of a video game.

12. One or more computer storage memory devices as recited in claim 10, wherein the multiple instructions further cause the one or more processors to:
obtain characteristics of the segment of content; and
include, in the bookmark, the characteristics of the segment of content.

13. One or more computer storage memory devices as recited in claim 12, wherein the characteristics of the segment of content include tags added by other users of other computing devices when creating other bookmarks associated with portions of the content that are included in the segment of content.

14. One or more computer storage memory devices as recited in claim 10, wherein the multiple instructions further cause the one or more processors to share the bookmark with one or more other users.

15. One or more computer storage memory devices as recited in claim 10, further comprising the user explicitly entering an expression regarding a particular attribute of the segment of content.

16. A system comprising:
a client device having memory; and
one or more processors coupled to the memory, the memory comprising instructions executable by the one or more processors to perform operations comprising:
receiving a request from a user to bookmark a segment of audio and video content;
identifying the segment of the audio and video content associated with the bookmark, the segment of content having both a beginning location and an ending location in the content, the segment of the audio and video content being less than the entire audio and video content;
obtaining, using an image capture device at the client device, an emotional response of the user, the emotional response being automatically sensed and regarding a particular attribute of the segment;
generating a bookmark that includes an identification of the segment, one or more tags that include the emotional response of the user, and one or more tags that include characteristics of the segment, the characteristics of the segment including tags added by multiple additional users of other computing devices when creating other bookmarks associated with portions of the audio and video content that are included in the segment;
recommending additional content to the user by sending the bookmark to a recommendation service configured to identify the additional content based at least in part on an analysis of bookmarks that have been created in response to requests from the user, wherein recommendation of additional content is based on a particular emotional response of the user being identified more than a threshold number of times; and
splicing together multiple segments by sending the bookmark to a splicing service configured to analyze the bookmark and to splice multiple segments of content together to generate content collections based on bookmarks containing similar emotional responses of the user.

17. A method as recited in claim 1, wherein the recommendation of additional content is based on a particular expression of other users.

* * * * *